Figure 1:
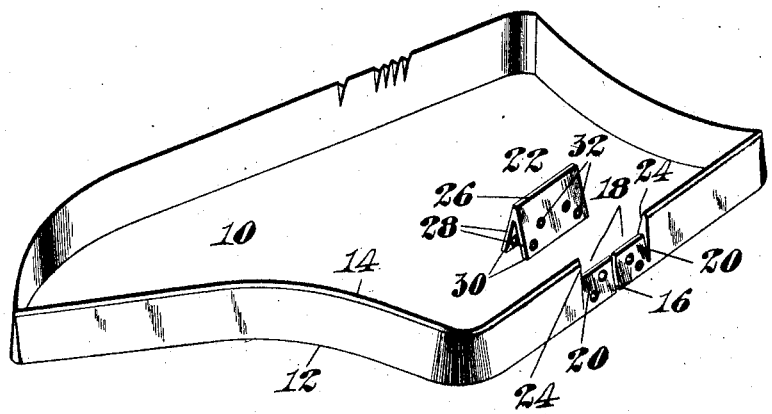

A. R. BRADEN.
DIE AND METHOD OF JOINING ITS ENDS.
APPLICATION FILED APR. 11, 1918.

1,327,652.  Patented Jan. 13, 1920.

INVENTOR
Albert R. Braden
By his Attorney

UNITED STATES PATENT OFFICE.

ALBERT R. BRADEN, OF BEVERLY, MASSACHUSETTS, ASSIGNOR TO UNITED SHOE MACHINERY CORPORATION, OF PATERSON, NEW JERSEY, A CORPORATION OF NEW JERSEY.

DIE AND METHOD OF JOINING ITS ENDS.

1,327,652.

Specification of Letters Patent. Patented Jan. 13, 1920.

Application filed April 11, 1918. Serial No. 228,008.

*To all whom it may concern:*

Be it known that I, ALBERT R. BRADEN, a citizen of the United States, residing at Beverly, in the county of Essex and State of Massachusetts, have invented certain Improvements in Dies and Methods of Joining Their Ends, of which the following description, in connection with the accompanying drawings, is a specification, like reference characters on the drawings indicating like parts in the several figures.

This invention relates to dies, particularly to the cutting dies known in the art of shoemaking as clicking dies, and to methods of joining their adjacent ends, which may not before have been connected or may have been separated by breaking.

Clicking dies are made of comparatively light band steel tapered from an edge, ordinarily only a quarter of an inch thick, to which the operating pressure is applied, to a sharpened edge, which is forced into the work to be cut. On account of the material, its dimensions and the manner of use, these dies are quite liable to be broken across the band. Because the welding of the ends, while maintaining the correct dimensions and form, is an operation requiring considerable skill, it has been customary for shoe manufacturers to forward broken dies to the maker for repair. This leads to the incurring of substantial expense and deprives the owner of the use of the dies for a considerable time.

It is an object of my invention to provide a die construction whereby adjacent ends, produced by breaking or otherwise, may be securely joined in a simple manner to give a true cutting edge, together with a method of effecting this connection which may be practised readily by inexperienced persons.

With these purposes in view, a feature of the invention consists of a die, at each side of the juncture of the ends of which is a connecting member extending over the opposite walls and in the line of the cutting edge and being secured to the die. In this cutting edge of the die there is preferably a recess to receive the edge portion of the connecting member. For use with tapered clicking dies, as here illustrated, the member has an apex situated in the recess, with arms diverging therefrom over the walls of the die. The ends of the die and the member may have securing means, as rivets, passing through alined openings.

Another feature of the invention involves the method of producing such a die connection as above described. In carrying out this method, there is applied to the die a piece extending upon opposite sides thereof at each side of the juncture of the ends, with a portion in the line of the cutting edge. This portion is caused to continue the cutting edge as by sharpening it, or seating the connecting piece in a recess formed in the edge of the die with the apex alined with the cutting edge, or both, and is secured to the die at each side of the juncture.

Figure 2:
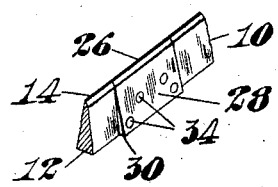

A die embodying this invention is illustrated in the accompanying drawing, in which Figure 1 is a perspective view of said die, with the connecting member separated therefrom; and Fig. 2 is a similar view of the completed connection.

The clicking die 10 is constructed of the usual tapered stock, this being of steel, the side walls of which converge from the edge 12, to which the operating pressure is applied, to the sharpened cutting edge 14. Such dies are customarily welded to furnish an unbroken band, but in Fig. 1 this band is shown as divided at 16, a condition which may arise through breakage. To form a continuous cutting edge of correct dimensions and of substantially the same strength as though welded, I prefer to remove, as by filing or grinding from the cutting edge at each side of the juncture between the ends, a portion of the material. This forms at each end a space or recess 18 extending, say, half or three-quarters of an inch along the band and three-sixteenths of an inch into the stock from the cutting edge. Between this recess and the edge 12, I may further remove material from the walls of the die so that said walls lie at a more obtuse angle to one another than the normal die walls, giving a slight recess at 20. Then from a length of stock of the proper form a connecting or repair member or insert 22 is cut, equal in length to the distance between the end walls 24, 24 of the recess 18 when the ends of the die at 16 are in contact. This repair stock may either be produced by a special rolling operation, or from regular die stock, by milling out a depression. In whatever manner it may be made, the stock is V-shaped in transverse section, having a narrow edge portion 26, preferably not sharpened, from which diverge arms 28, 28, shown as of equal thickness. The depth of the portion 26 is not greater than that of the material removed at 18. With the die so held that its ends at 16 contact, the member 22 is seated in the recesses 18 and 20, the arms 28 being forced over the walls of the recess 20 until their ends 30 lie in substantially the same plane as the edge 12 of the die, at which time the edge 26 of the insert is in the line of the cutting edge 14 of the die. Then holes 32 are drilled in alinement through both arms of the member 22, and the ends of the die at the bottom of the recess 20 secured together, most conveniently by rivets 34. Finally, the portion 26 is suitably reduced or sharpened to furnish a true and continuous cutting edge, as illustrated in Fig. 2 of the drawings. The arms of the insert protrude slightly beyond the wall of the die, especially near the edge 12, but this does not interfere with the use of the die, and to make the recess 20 deeper at these points tends to weaken the structure. With the repair stock provided, the operation of joining the ends of a die requires nothing but readily available tools, and no greater skill than is possessed by the ordinary workman.

Having fully described my invention, what I claim as new and desire to secure by Letters Patent of the United States is:

1. A die formed with a cutting edge and having adjacent ends, a member extending over the opposite walls of the die at each side of the juncture between the ends and continuing the cutting edge, and means for securing the member to the die.

2. A die formed with a cutting edge and having adjacent ends, a member extending over the opposite walls of the die and beyond the surface thereof at each side of the juncture between the ends and in the line of the cutting edge, and means for securing the member to the die.

3. A die formed with a cutting edge and having adjacent ends, there being a recess in the cutting edge at each side of the juncture of said ends, a member situated in the recess and having portions extending over the opposite walls of the die, and means for securing the member to the die.

4. A die formed with a cutting edge and having adjacent ends, there being a recess in the cutting edge at each side of the juncture of said ends, a member situated in the recess and having portions extending over the opposite walls of the die and a cutting edge alined with that of the die, and means for securing the member to the die.

5. A die formed with a cutting edge and having adjacent ends, there being a recess in the cutting edge at each side of the juncture of said ends, a member situated in the recess and having portions extending over the opposite walls of the die, there being alined openings in the member and in each end of the die, and securing means extending through the openings.

6. A die formed with a cutting edge and having adjacent ends, there being a recess in the cutting edge at each side of the juncture of said ends, a member having an apex situated in the space and arms diverging from the apex overlying the walls of the die, and means for securing said arms to both ends of the die.

7. A die tapered from a cutting edge and having adjacent ends, there being a space in the cutting edge at each side of the juncture of said ends, the walls between said space and the opposite edge of the die being tapered differently from the die to produce recesses, a member situated in said space and in the recesses, and means for securing the member to the ends of the die.

8. A die tapered from a cutting edge and having adjacent ends, there being a space in the cutting edge at each side of the juncture of said ends, the walls between said space and the opposite edge of the die being tapered differently from the die to produce recesses, a V-shaped member having its apex situated in the space and its arms entering the recesses, and means for securing the member to the ends of the die.

9. The method of joining the ends of cutting dies, which consists in applying to a die a member extending on opposite sides of its juncture, causing a portion of the member to continue the cutting edge, and securing the member to the die at each side of the juncture.

10. The method of joining the ends of cutting dies, which consists in applying to a die a member extending on opposite sides of its juncture and in the line of the cutting edge, securing the member to the die at each side of the juncture, and sharpening said member to correspond to the cutting edge of the die.

11. The method of joining the ends of cutting dies, which consists in applying to a die a member extending on opposite sides of its juncture and through the line of the cutting edge from one side of the die to the other, securing the member in contact with both sides of the die at opposite sides of the juncture, and reducing that portion of the member extending through the line of the cutting edge of the die to said line.

12. The method of joining the ends of cutting dies, which consists in applying to a die a member extending on opposite sides of its juncture and in the line of the cutting edge, producing alined openings in the member and die at each side of the juncture, inserting fastenings in the alined openings, and sharpening the member to correspond to the cutting edge of the die.

13. The method of repairing broken dies, which consists in removing material from the cutting edge of a die at each side of the break, inserting in the space thus formed a repair insert, and securing said repair insert in place.

14. The method of repairing broken dies, which consists in removing material from the cutting edge of a die at each side of the break, inserting in the space thus formed a repair insert having an edge portion alined with the cutting edge of the die, securing said repair insert in place, and sharpening its edge portion.

15. The method of repairing broken dies, which consists in removing material from the cutting edge of a die at each side of the break, inserting in the space thus formed a repair insert having arms extending at opposite sides of the die between said space and the edge of the die opposite the cutting edge, and securing said arms to the die.

16. The method of repairing broken dies, which consists in removing material from the cutting edge of a die at each side of the break, inserting in the space thus formed a repair insert having an edge portion alined with the cutting edge of the die and arms extending at opposite sides of the die, securing said arms to the die, and sharpening the edge portion of the repair insert.

17. The method of repairing broken dies, which consists in removing material from the cutting edge of a die at each side of the break, inserting in the space thus formed a repair insert having an edge portion alined with the cutting edge of the die and arms extending at opposite sides of the die, drilling openings through the repair insert and die at opposite sides of the break, riveting the repair insert and die together through the openings, and sharpening the edge portion of the repair insert.

In witness whereof I have signed my name to this specification.

ALBERT R. BRADEN.